April 16, 1929.  C. B. THWING  1,709,638
TESTING MACHINE
Filed Dec. 15, 1924
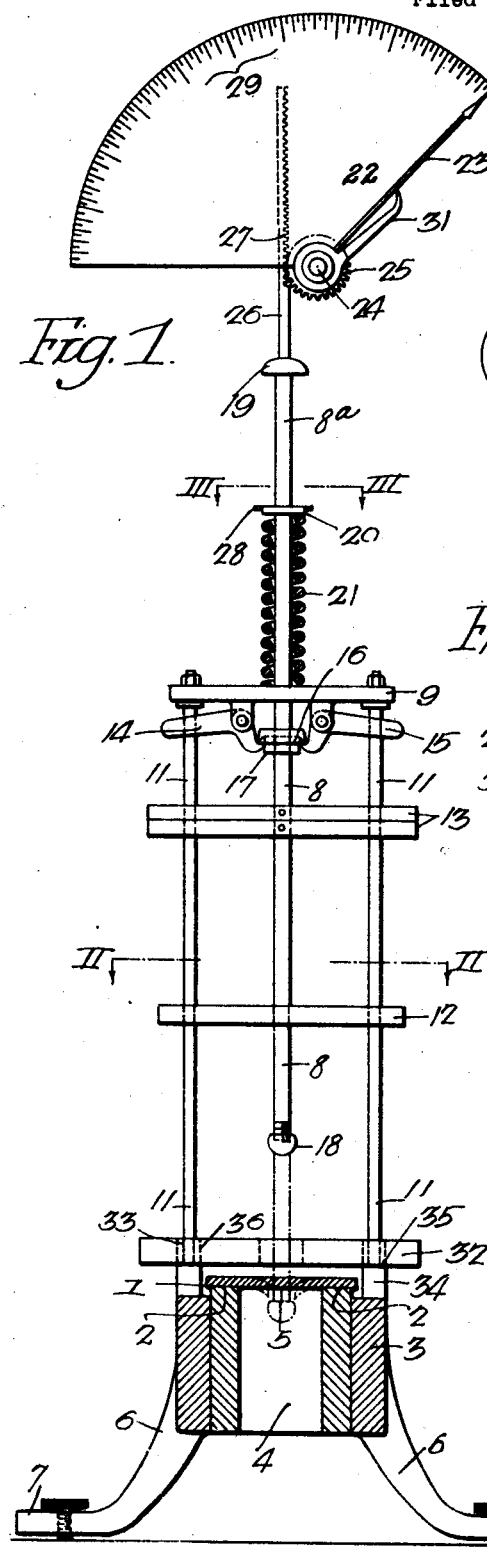
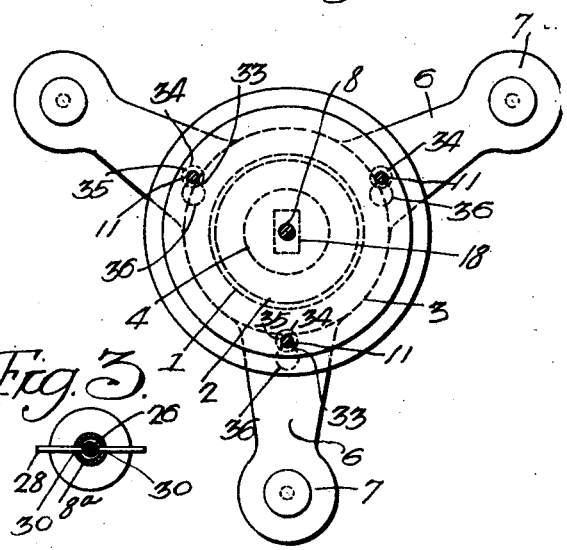
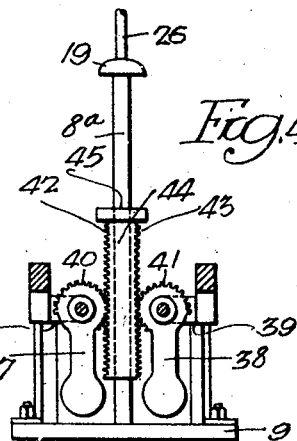
Inventor:-
Charles B. Thwing.
by his Attorneys,-
Howson & Howson Patented Apr. 16, 1929.

1,709,638

UNITED STATES PATENT OFFICE.

CHARLES B. THWING, OF PHILADELPHIA, PENNSYLVANIA, ASSIGNOR TO THWING INSTRUMENT COMPANY, OF PHILADELPHIA, PENNSYLVANIA, A CORPORATION OF PENNSYLVANIA.

TESTING MACHINE.

Application filed December 15, 1924. Serial No. 756,030.

My invention relates to testing apparatus and methods of operating the same, and it has for one object the provision of a device of simple and compact design that shall permit the direct determination of the strength of a fabric or the like.

Another object of my invention is to provide a testing device, wherein the bursting strength of a specimen may be measured by observing the retarding effect of the specimen on a mass projected therethrough.

A further object of my invention is to provide a means for and method of accurately measuring the strength of a fabric having a pronounced grain.

Other objects and applications of my invention, as well as details of construction and operation, whereby my invention may be practiced, will be apparent more fully hereinafter when taken in connection with the accompanying drawing, wherein Fig. 1 is a side elevational view of a testing machine embodying my invention; and Figs. 2 and 3 are horizontal sectional views taken on the lines II—II and III—III, respectively, of Fig. 1; and Fig. 4 is a detail view of alternative means for bringing the plunger to rest.

In the illustrated embodiment of my invention shown in the drawing, a specimen 1 to be tested, which may be of such sheet material as metal, paper, cloth, etc., is supported at its edges on an annular shoulder 2 of a base member 3 which is formed with a central, vertically extending opening 4 disposed directly beneath a central portion 5 of the specimen 1. The base member 3 may be provided with supporting legs 6 having adjustable feet 7.

A plunger 8 is movably positioned in vertical alignment with the central portion 5 of the specimen 1 by means of a guide member 9 which is secured to the upper end of three standards extending vertically from the base 3 and disposed in the form of a triangle. The lower end of the plunger 8 may be guided by means of a plate member 12 which is rigidly secured to the standards 11.

The force of the plunger 8 may be adjusted to a desired value by securing thereto one or more weights 13. The latter may be perforated to receive the standards 11, whereby the weights 13 may constitute further guiding means for the plunger 8. A pair of latches 14 and 15 are pivotally mounted on the underside of the upper supporting member 9 and are adapted to co-act with shoulder portions 16 formed on a member 17 carried by the plunger 8, whereby the latter may be detachably supported in the elevated position shown in the drawing.

As illustrated in Figs. 1 and 3, the lower end of the plunger 8 may be provided with a transversely extending specimen engaging portion 18 preferably cylindrical in form, and it may constitute an integral extension or, as shown in the drawing, a removable portion of the plunger 8. The particular advantage of the end portion 18 over a spherical end portion is that it permits measurements of the fabric 1 longitudinally as well as transversely of the grain thereof, with the result that the relative strength of the specimen 1 in the two directions may be ascertained.

The upper end of the plunger 8 is provided with a shoulder 19 positioned to engage a cap member 20, which is mounted on the end of a spring 21 supported on the member 9, just as the head portion 18 of the plunger 8 passes clear of the underside of the specimen 1. The force of the spring 21 is such that the plunger 8 is then rapidly brought to rest. Since the movement of the plunger 8 after it passes through the specimen 1 is inversely proportional to the strength thereof, my invention contemplates mechanism 22 for directly indicating such movement.

The mechanism 22 comprises a pointer 23 which is frictionally mounted on a shaft 24 loosely carrying a pinion 25. A vertical rod 26 has a rack portion 27 on the upper end thereof disposed in mesh with the pinion 25. A lower end of the rod 26 is disposed in a tubular upper end portion $8^a$ of the plunger 8, and it is supported by a pin 28 which extends through vertical slots 30, 30 in the plunger 8 so as to engage grooves formed in the upper side of the cap member 20. The pinion 25 carries an arm 31 which normally engages the pointer 23 when the plunger 8 is in the elevated position shown in Fig. 1, whereby the pointer 23 may be actuated in accordance with the deflection of the spring 21 as the plunger 8 projects through the specimen 1.

The pointer 23 moves over a scale 29 which is so graduated that the pointer 23 moves to the zero mark when the plunger 8 falls freely, that is, without engaging a test specimen. Since the pointer 23 is frictionally mounted on the shaft 24, it remains in the most advanced position as the plunger 8 is returned to its elevated position. Thus the pointer 23 and cooperating scale 29 directly indicates the decrease in movement of the plunger 8 due to a specimen, thereby permitting the direct measurement of the strength of said specimen.

The specimen 1 may be clamped in position on the supporting shoulder 2 at a constant pressure by means of a weighted member 32. The weighted member 32 may be supported in a raised position out of engagement with the specimen 1, when the testing machine is not in use, by providing the same with slots 33 having a width equal to the diameter of the standards 11. Immediately adjacent to the base portion of each of the standards 11, an enlarged cylindrical portion 34 is formed providing a shoulder 35 which serves to support the weighted member 32 in its elevated position. Each of the slots 33 terminates in an enlarged portion 36 having a diameter corresponding to that of the enlarged standard portion 34. The weighted member 32 may thus be brought into engagement with the specimen 1 by first actuating the member 32 laterally so as to bring the enlarged portion 36 of the slot 33 into alignment with the enlarged standard portion 34, and then lowering the weighted member 32 into engagement with the specimen 1.

In operation, assuming the plunger 8 in the elevated position shown in Fig. 1 of the drawing, when the latches 14 and 15 are actuated to release the weighted plunger 8, the latter falls, bursting through the specimen 1, as shown in dot-and-dash lines in Fig. 1. As the blunt head portion 18 of the plunger 8 moves clear of the underside of the specimen 1, the shoulder 19 of the plunger 8 engages the cap member 20 on the upper end of the spring 21 and compresses the same an amount proportional to the force remaining in the plunger 8. The movement of the spring 21 causes a corresponding movement of the pointer 23 over the scale 29. Since, as hereinbefore stated, the scale 29 is so calibrated that the zero point thereof represents the maximum deflection of the spring 21 when the energy of the falling plunger 8 is not absorbed by a test specimen, the present maximum movement of the pointer 23 directly indicates the energy loss of the plunger 8 and hence the strength of the specimen 1.

The strength of box board and other fabrics has different values when measured with or across the grain. The different values may be compared by inserting one specimen with the grain or corrugations parallel to the axis of the cylinder and making a test, and afterward inserting a second specimen with the grain or corrugations running at right angles to the axis of the cylinder.

Fig. 4 illustrates alternative means for bringing the plunger 8 to rest after the head 18 passes through the specimen 1, said means comprising a pair of pendulums 37 and 38 which are pivotally mounted on a supporting member 39 carried by the upper guide member 9. The pendulums 37 and 38 are provided with toothed portions 40 and 41 which respectively co-act with racks 42 and 43 mounted on opposite guides of a cylinder 44 slidably embracing the plunger 8. The upper end of the plunger is provided with enlarged portions 45 corresponding to the cap member 20 of Fig. 1. When the shoulder 19 of the plunger 8 engages the enlarged portion 45, the cylinder 44 and racks 42 and 43 are depressed until the retarding action of the pendulums 37 and 38 becomes sufficient to bring the plunger 8 to rest. The operation of the indicating mechanism 22 is as previously described for the structure of Fig. 1.

While I have shown two forms of embodiment of my invention, for the purpose of describing the same and illustrating its principles of construction and operation, it is apparent that various changes and modifications may be made therein without departing from the spirit and scope of my invention, and I desire, therefore, that only such limitations shall be imposed thereon as are indicated in the appended claims or as are demanded by the prior art.

I claim:

1. A testing machine comprising a falling mass adapted to be projected through a member to be tested, and means for exerting a retarding force of increasing magnitude on said mass after it extends through said member.

2. A testing machine comprising means positioned to fall from an elevated position through a member to be tested, means for gradually bringing said falling means to rest after at least a portion of said last-mentioned means passes through said member, and indicating means responsive to said second-mentioned means.

3. Testing apparatus comprising means for supporting a specimen, a movable plate for clamping said specimen in position with a constant force, and a gravity-operated plunger adapted to subject said specimen to bursting strains.

4. In a testing apparatus, the combination with a support for a specimen, of a movable clamping plate for said specimen, a gravity-operated member positioned to be projected through said specimen, and means for indicating the retarding action of said specimen on said movable member.

5. In combination, means for clamping a specimen in position with a constant pressure, a gravity-operated plunger adapted to be projected through said specimen, and indicating means responsive to said plunger.

6. In a device of the character described, means for releasably clamping a specimen in position, a plunger adapted to be released from an elevated position, so that said plunger may burst through said specimen, and means for measuring the retarding action of said specimen on said falling plunger.

7. Apparatus comprising means for clamping a specimen, a plunger movable from an elevated position through said specimen, and means for damping the movement of said plunger after it passes through said specimen.

8. Apparatus comprising means for clamping a specimen, a plunger movable from an elevated position through said specimen, and means for damping the movement of said plunger after it passes through said specimen, the end of said plunger having a blunt work-engaging portion.

9. Apparatus comprising means for clamping a specimen, a plunger movable from an elevated position through said specimen, means for damping the movement of said plunger after it passes through said specimen, the end of said plunger having a curved specimen-engaging surface, and indicating means responsive to a movement of said damping means.

10. In a testing machine of the character indicated, a removable weighted block adapted to clamp a specimen at a constant pressure.

11. A testing machine comprising a plunger adapted to fall from an elevated position through a specimen, resilient means adapted to retard the movement of said plunger after it passes through said specimen, and means responsive to said retarding means for indicating the effect of the specimen on said falling plunger.

12. Testing apparatus comprising a plunger movable from an elevated position through a specimen, a spring, means extending from said plunger so as to engage said spring when said plunger passes through said specimen, whereby the plunger may be brought to rest, and measuring means responsive to a movement of said plunger against the resistance of said spring.

13. Testing apparatus comprising a clamping block movable from an ineffective to an effective position to secure a specimen in position, a weighted plunger movable from an elevated position through said specimen, means for bringing said plunger to rest after it passes through said specimen, and indicating means responsive to a movement of said means, whereby the strength of said specimen may be ascertained.

CHARLES B. THWING.